US009805745B1

(12) United States Patent
Takagishi et al.

(10) Patent No.: US 9,805,745 B1
(45) Date of Patent: Oct. 31, 2017

(54) MAGNETIC RECORDING AND REPRODUCING DEVICE COMPRISING A MAGNETIC HEAD INCLUDING A TRAILING SHIELD AND FIRST AND SECOND SHIELDS HAVING ALTERNATING MAGNETIC AND NONMAGNETIC LAYERS

(71) Applicant: KABUSHIKI KAISHA TOSHIBA, Tokyo (JP)

(72) Inventors: Masayuki Takagishi, Tokyo (JP); Naoyuki Narita, Kanagawa (JP); Tomoyuki Maeda, Kanagawa (JP); Yousuke Isowaki, Kanagawa (JP); Katsuya Sugawara, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 15/442,312

(22) Filed: Feb. 24, 2017

(30) Foreign Application Priority Data

Aug. 30, 2016 (JP) .................................. 2016-167852

(51) Int. Cl.
  *G11B 5/31* (2006.01)
(52) U.S. Cl.
  CPC ............ *G11B 5/315* (2013.01); *G11B 5/3116* (2013.01); *G11B 5/3143* (2013.01)
(58) Field of Classification Search
  CPC ...... G11B 5/3116; G11B 5/3143; G11B 5/315
  USPC ...................................................... 360/125.3
  See application file for complete search history.

(56) References Cited

U.S. PATENT DOCUMENTS

| 7,715,152 | B2 | 5/2010 | Okada et al. |
| 8,254,059 | B2 | 8/2012 | Horide et al. |
| 8,970,992 | B2 * | 3/2015 | Benakli ................. G11B 5/3116 360/319 |
| 9,111,550 | B1 * | 8/2015 | Liu ........................... G11B 5/11 |
| 9,384,764 | B1 * | 7/2016 | Biskeborn ................ G11B 5/40 |
| 2006/0098334 | A1 * | 5/2006 | Jayasekara ........... G11B 5/1278 360/125.17 |
| 2007/0268626 | A1 * | 11/2007 | Taguchi .................... G11B 5/11 360/125.02 |

(Continued)

FOREIGN PATENT DOCUMENTS

JP 4260002 4/2009
JP 2012-123894 6/2012

*Primary Examiner* — Jefferson Evans
(74) *Attorney, Agent, or Firm* — Finnegan, Henderson, Farabow, Garrett & Dunner, L.L.P.

(57) ABSTRACT

According to one embodiment, a magnetic head includes first and second shields, a magnetic pole, and a trailing shield. The magnetic pole is provided between the first and second shields. The trailing shield is separated from the magnetic pole. The first shield includes first magnetic layers and first nonmagnetic layers arranged alternately along a first stacking direction. The first nonmagnetic layers include at least one selected from the group consisting of Ru, Cu, and Cr. Thicknesses of the first nonmagnetic layers each is not less than 0.3 nanometers and not more than 2.2 nanometers. The second shield includes second magnetic layers and second nonmagnetic layers arranged alternately along a second stacking direction. The second nonmagnetic layers include at least one selected from the group consisting of Ru, Cu, and Cr. Thicknesses of the second nonmagnetic layers each is not less than 0.3 nanometers and not more than 2.2 nanometers.

17 Claims, 7 Drawing Sheets

(56) References Cited

U.S. PATENT DOCUMENTS

| | | | | |
|---|---|---|---|---|
| 2011/0075294 A1* | 3/2011 | Fuchizaki | ............ | G11B 5/1278 360/123.12 |
| 2012/0063032 A1* | 3/2012 | Meloche | ............... | G11B 5/1278 360/125.01 |
| 2012/0075748 A1* | 3/2012 | Kief | ......................... | C25D 5/12 360/121 |
| 2014/0293474 A1* | 10/2014 | Yamane | ............... | G11B 5/3932 360/75 |
| 2015/0002959 A1* | 1/2015 | Basu | ......................... | G11B 5/11 360/125.03 |
| 2015/0199982 A1* | 7/2015 | Mooney | ............... | G11B 5/1278 427/131 |

\* cited by examiner

MAGNETIC RECORDING AND REPRODUCING DEVICE COMPRISING A MAGNETIC HEAD INCLUDING A TRAILING SHIELD AND FIRST AND SECOND SHIELDS HAVING ALTERNATING MAGNETIC AND NONMAGNETIC LAYERS

CROSS-REFERENCE TO RELATED APPLICATIONS

This application is based upon and claims the benefit of priority from Japanese Patent Application No. 2016-167852, filed on Aug. 30, 2016; the entire contents of which are incorporated herein by reference.

FIELD

Embodiments described herein relate generally to a magnetic head and a magnetic recording and a recording device.

BACKGROUND

Information is recorded in a magnetic storage medium such as a HDD (Hard Disk Drive), etc., by using a magnetic head. It is desirable to increase the response speed for the magnetic head and a magnetic recording and reproducing device.

DETAILED DESCRIPTION

Figure 1:
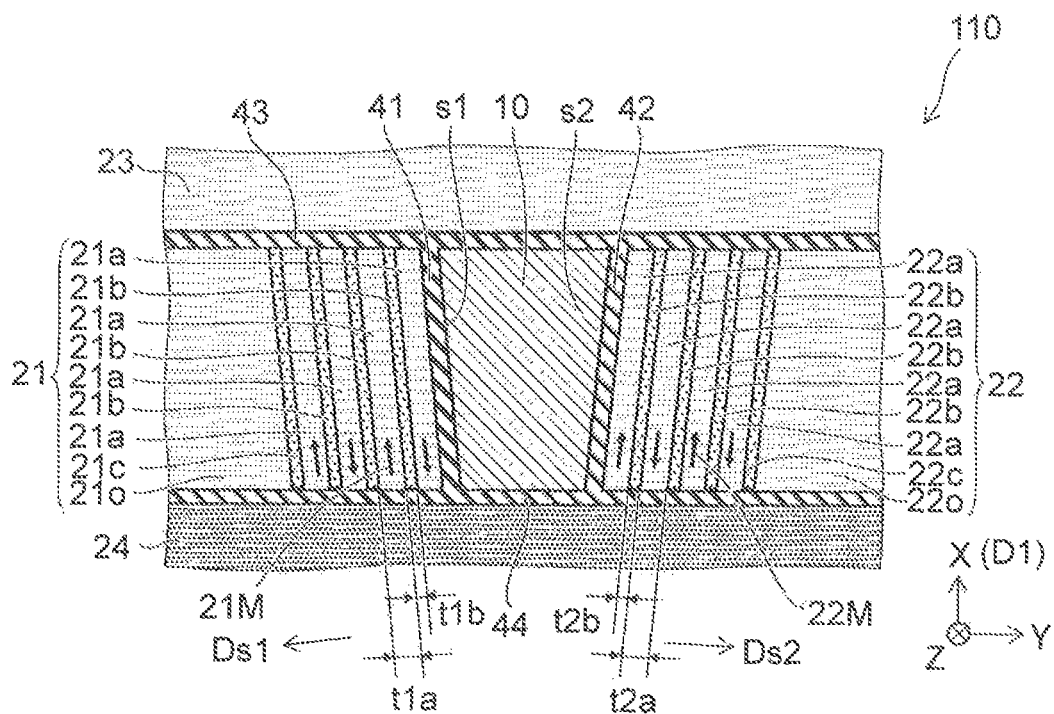
FIG. 1 is a schematic plan view illustrating a magnetic head according to a first embodiment.

According to one embodiment, a magnetic head includes a first shield, a second shield, a magnetic pole, and a trailing shield. The magnetic pole is provided between the first shield and the second shield. The trailing shield is separated from the magnetic pole in a first direction crossing a direction from the first shield toward the second shield. The first shield includes a plurality of first magnetic layers and a plurality of first nonmagnetic layers arranged alternately along a first stacking direction crossing the first direction. The first nonmagnetic layers include at least one selected from the group consisting of Ru, Cu, and Cr. Thicknesses of the first nonmagnetic layers each is not less than 0.3 nanometers and not more than 2.2 nanometers. The second shield includes a plurality of second magnetic layers and a plurality of second nonmagnetic layers arranged alternately along a second stacking direction crossing the first direction. The second nonmagnetic layers include at least one selected from the group consisting of Ru, Cu, and Cr. Thicknesses of the second nonmagnetic layers each is not less than 0.3 nanometers and not more than 2.2 nanometers.

Various embodiments will be described hereinafter with reference to the accompanying drawings.

The drawings are schematic and conceptual; and the relationships between the thickness and width of portions, the proportions of sizes among portions, etc., are not necessarily the same as the actual values thereof. Further, the dimensions and proportions may be illustrated differently among drawings, even for identical portions.

In the specification and drawings, components similar to those described or illustrated in a drawing thereinabove are marked with like reference numerals, and a detailed description is omitted as appropriate.

First Embodiment

FIG. 1 is a schematic plan view illustrating a magnetic head according to a first embodiment.

FIG. 1 is a plan view of the magnetic head 110 when viewed from one direction. The direction is a medium-opposing surface of the magnetic head 110.

As shown in FIG. 1, the magnetic head 110 according to the embodiment includes a first shield 21, a second shield 22, a trailing shield 23, and a magnetic pole 10. The first shield 21 and the second shield 22 are, for example, side shields.

The magnetic pole 10 is provided between the first shield 21 and the second shield 22. The magnetic pole 10 is, for example, a major electrode.

The trailing shield 23 is separated from the magnetic pole 10 in a first direction D1. The first direction D1 crosses the direction connecting the first shield 21 and the second shield 22. The direction connecting the first shield 21 and the second shield 22 corresponds to a direction from the first shield 21 toward the second shield 22.

The first direction D1 is taken as an X-axis direction. One direction perpendicular to the X-axis direction is taken as a Y-axis direction. A direction perpendicular to the X-axis direction and the Y-axis direction is taken as a Z-axis direction.

The first direction D1 (the X-axis direction) is, for example, a down-track direction. The direction connecting the first shield 21 and the second shield 22 is, for example, the track width direction (the cross-track direction). This direction is, for example, the Y-axis direction. The Z-axis direction is, for example, the height direction.

For example, a coil (not illustrated) is provided at the magnetic head 110. The magnetic pole 10 is magnetically excited by the coil. A magnetic field (a recording magnetic field) that corresponds to the current (the recording current) flowing in the coil is generated from the magnetic pole 10. The magnetic field is applied to a magnetic recording medium. Information that corresponds to the recording current is recorded in the magnetic recording medium. The magnetic head 110 is, for example, a recording unit.

In the example, the magnetic head 110 further includes a leading shield 24. The magnetic pole 10 is provided between the trailing shield 23 and the leading shield 24.

First to fourth insulating portions 41 to 44 are provided in the example. The first insulating portion 41 is provided between the first shield 21 and the magnetic pole 10. The second insulating portion 42 is provided between the second shield 22 and the magnetic pole 10. The third insulating portion 43 is provided between the trailing shield 23 and the magnetic pole 10. The fourth insulating portion 44 is provided between the leading shield 24 and the magnetic pole 10. The first insulating portion 41, the second Insulating portion 42, and the fourth insulating portion 44 may be continuous with each other. These insulating portions include, for example, an insulating material such as silicon dioxide, etc.

The magnetic pole 10 has two side surfaces (a first side surface s1 and a second side surface s2). The first side surface s1 opposes the first shield 21. The second side surface s2 opposes the second shield 22. These side surfaces cross the Y-axis direction.

In the embodiment, stacked structures are provided in the side shields.

For example, the first shield 21 includes multiple first magnetic layers 21a and multiple first nonmagnetic layers 21b. The multiple first magnetic layers 21a and the multiple first nonmagnetic layers 21b are arranged alternately along a first stacking direction Ds1. The first stacking direction Ds1 crosses the first direction D1.

In the case where the first side surface s1 of the magnetic pole 10 is parallel to the first direction D1, the first stacking direction Ds1 is parallel to the Y-axis direction. In the example, the first side surface s1 is tilted with respect to the first direction D1. In such a case, the first stacking direction Ds1 is tilted with respect to the Y-axis direction.

The multiple first nonmagnetic layers 21b include at least one selected from the group consisting of Ru, Cu, and Cr. A thickness t1b of each of the multiple first nonmagnetic layers 21b is not less than 0.3 nanometers (nm) and not more than 2.2 nm. The thickness t1b of one of the multiple first nonmagnetic layers 21b is the length along the first stacking direction Ds1. In the case where the multiple first nonmagnetic layers 21b include Ru, the thickness t1b is, for example, not less than 0.6 nm and not more than 1.0 nm (e.g., about 0.8 nm). In the case where the multiple first nonmagnetic layers 21b include Cu, the thickness t1b is, for example, not less than 1.3 nm and not more than 1.7 nm (e.g., about 1.5 nm). In the case where the multiple first nonmagnetic layers 21b include Cr, the thickness t1b is, for example, not less than 1.8 nm and not more than 2.2 nm (e.g., about 2.0 nm).

On the other hand, the second shield 22 includes multiple second magnetic layers 22a and multiple second nonmagnetic layers 22b. The multiple second magnetic layers 22a and the multiple second nonmagnetic layers 22b are arranged alternately along a second stacking direction Ds2. The second stacking direction Ds2 crosses the first direction D1.

In the case where the second side surface s2 of the magnetic pole 10 is parallel to the first direction D1, the second stacking direction Ds2 is parallel to the Y-axis direction. In the example, the second side surface s2 is tilted with respect to the first direction D1. In such a case, the second stacking direction Ds2 is tilted with respect to the Y-axis direction.

The multiple second nonmagnetic layers 22b include at least one selected from the group consisting of Ru, Cu, and Cr. A thickness t2b of each of the multiple second nonmagnetic layers 22b is not less than 0.3 nm and not more than 2.2 nm. The thickness t2b of one of the multiple second nonmagnetic layers 22b is the length along the second stacking direction Ds2. In the case where the multiple second nonmagnetic layers 22b include Ru, the thickness t2b is, for example, not less than 0.6 nm and not more than 1.0 nm (e.g., about 0.8 nm). In the case where the multiple second nonmagnetic layers 22b include Cu, the thickness t2b is, for example, not less than 1.3 nm and not more than 1.7 nm (e.g., about 1.5 nm). In the case where the multiple second nonmagnetic layers 22b include Cr, the thickness t2b is, for example, not less than 1.8 nm and not more than 2.2 nm (e.g., about 2.0 nm).

The multiple first magnetic layers 21a and the multiple second magnetic layers 22a include, for example, at least one selected from the group consisting of Fe, Co, and Ni.

It was found that the responses of the magnetizations of the side shields can be faster by applying such a stacked structure to the side shields. Thereby, a magnetic head and a magnetic recording and reproducing device can be provided in which the response speed can be increased.

The inventor of the application investigated the response of the magnetic head 110 for the relaxation times of the magnetic pole 10 and the trailing shield 23. As a result, it was found that a relatively fast response of about 0.5 nsec is obtained for the relaxation times of the magnetic pole 10 and the trailing shield 23. Conversely, data was obtained that suggests extremely long relaxation times of the side shields. An example of the Investigation results of the relaxation times of the side shields will now be described.

Figure 2:
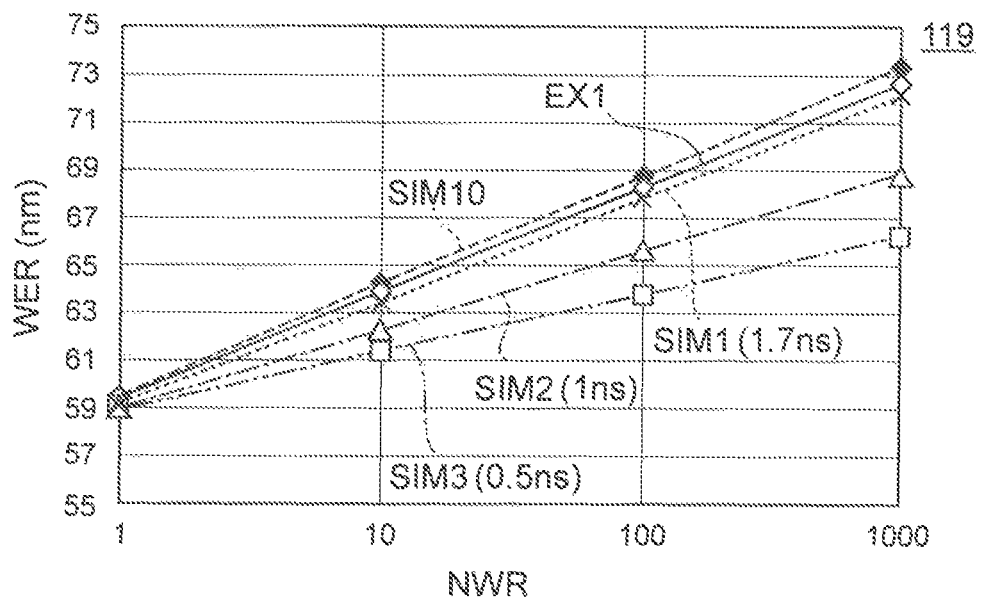
FIG. 2 is a graph illustrating characteristics of a magnetic head.

FIG. 2 is a graph illustrating characteristics of a magnetic head.

This figure shows the characteristics of the magnetic head 119 of a reference example. In the reference example, a stacked structure such as that recited above is not applied to the side shields. The horizontal axis of FIG. 2 is a recording count NWR. The vertical axis of FIG. 2 is an erase width WER (nm). Recording is performed multiple times on the magnetic recording medium by the magnetic head. For example, recording is performed in one track; and subsequently, recording is performed in a track adjacent to the one track. At this time, information of a subsequent recording is recorded in a portion of a track of a previous recording. Overwriting is performed. The relaxation times of the side shields have a relationship with the width of the overwriting (the erase width WER). When the erase width WER is small, the track density can be increased. The relaxation times of the side shields affect the erase width WER and the track density.

In FIG. 2, a simulation result SIM10 that is based on micromagnetics based on the LLG equation is shown in addition to an experimental value EX1. Further, the simulation characteristics relating to three conditions (a first condition SIM1, a second condition SIM2, and a third condition SIM3) are shown in FIG. 2. The simulations that relate to the three conditions are based on a simulator (TML) in which the relaxation time of a dynamic magnetic circuit method is developed using a finite element method. The relaxation time of the dynamic magnetic circuit method is reported in IEEE Transactions On Magnetics, Vol. 33, No. 5, September 1997.

For the first condition SIM1, the relaxation time of the side shield is 1.7 ns. For the second condition SIM2, the relaxation time of the side shield is 1 ns. For the third condition SIM3, the relaxation time of the side shield is 0.5 ns.

It can be seen from FIG. 2 that the experimental value EX1 is near the characteristic of the first condition SIM1. Therefore, it is considered that the relaxation time of the side shield is 1.7 ns or more.

Thus, although the relaxation times of the magnetic pole 10 and the trailing shield 23 are short and are about 0.5 nsec, the relaxation times of the side shields are extremely long and are 1.7 ns or more. It is considered that this affects the response of the magnetic head.

The inventor of the application further investigated the long relaxation time of the side shield. The investigation results will now be described.

Figures 3A, 3B:
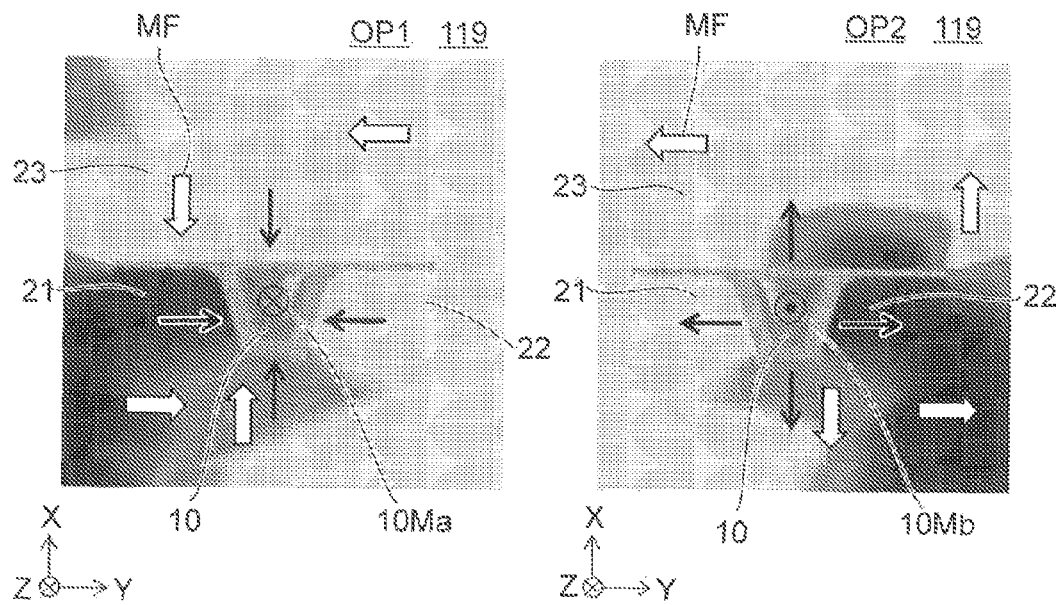
FIG. 3A and FIG. 3B are schematic views illustrating characteristics of the magnetic head.

FIG. 3A and FIG. 3B are schematic views illustrating characteristics of the magnetic head.

These figures show examples of the change of the magnetization of the magnetic head 119 of the reference example. These figures are examples of simulation results using micromagnetics based on the LLG equation. These figures correspond to figures of the magnetic head 119 when viewed from the medium-opposing surface. FIG. 3A corresponds to a first recording operation OP1; and FIG. 3B corresponds to a second recording operation OP2. In the first recording operation OP1, a magnetic field 10Ma is generated from the magnetic recording medium toward the magnetic pole 10. In the second recording operation OP2, a magnetic field 10Mb is generated from the magnetic pole 10 toward the magnetic recording medium. A direction MF of the magnetic field is shown in these figures. In these figures, a magnetization in the +Y direction (the orientation from the left toward the right in the figure) is generated in the regions where the concentration is high. A magnetization in the −Y direction (the orientation from the right toward the left in the figure) is generated in the regions where the concentration is low.

As shown in FIG. 3A, it can be seen that the concentration in the figure is low and a magnetization in the −Y direction is generated in the region of the trailing shield 23. As shown in FIG. 3B, it can be seen that even here, the concentration in the figure is low and a magnetization in the −Y direction is generated in the region of the trailing shield 23. Thus, there is not a large change of the orientation of the magnetization in the region of the trailing shield 23 between the first recording operation OP1 and the second recording operation OP2.

Conversely, at the side shields (the first shield 21 and the second shield 22), the orientation of the magnetization changes greatly between the first recording operation OP1 and the second recording operation OP2.

In the first recording operation OP1 as shown in FIG. 3A, the direction MF of the magnetic field is an orientation from the left toward the right in the region of the first shield 21. In the region of the second shield 22, the direction MF of the magnetic field is an orientation from the right toward the left.

On the other hand, in the second recording operation OP2 as shown in FIG. 3B, the direction MF of the magnetic field is an orientation from the right toward the left in the region of the first shield 21. In the region of the second shield 22, the direction MF of the magnetic field is an orientation from the left toward the right.

Thus, at the side shields, the magnetization changes according to the movement of large magnetic domains. When the magnetization reverses between the two recording operations, the large magnetic domains move around the magnetic pole 10. It is considered that this affects the long relaxation time of the side shields.

It is considered that the relaxation times of the side shields can be reduced by setting the magnetic domains of the side shields to be small.

In the embodiment as described in reference to FIG. 1, a stacked structure is applied to the side shields (the first shield 21 and the second shield 22). In the stacked structure, a nonmagnetic layer is provided between multiple magnetic layers. The nonmagnetic layer includes at least one selected from the group consisting of Ru, Cu, and Cr. The thickness of the nonmagnetic layer is not less than 0.3 nm and not more than 2.2 nm.

Thereby, the formation of large magnetic domains in the side shields can be suppressed. Thereby, the relaxation times of the side shields can be reduced. In the embodiment, the relaxation times of the side shields can be about 0.8 ns or less. Thereby, a magnetic head and a magnetic recording and reproducing device can be provided in which the response speed can be increased.

Because the nonmagnetic layer includes at least one selected from the group consisting of Ru, Cu, and Cr and the thickness of the nonmagnetic layer is not less than 0.3 nm and not more than 2.2 nm, the multiple magnetic layers are antiferromagnetically coupled to each other. Thereby, the magnetizations of the multiple magnetic layers are more stable.

For example, the multiple first magnetic layers 21a are antiferromagnetically coupled to each other. The multiple second magnetic layers 22a are antiferromagnetically coupled to each other.

As shown in FIG. 1, each of the multiple first magnetic layers 21a has a magnetization 21M. One of the multiple first magnetic layers 21a and one other of the multiple first magnetic layers 21a most proximal to the one of the multiple first magnetic layers 21a are focused upon. The magnetization 21M of the one of the multiple first magnetic layers 21a has a component having the opposite orientation of the orientation of the magnetization 21M of the one other of the multiple first magnetic layers 21a most proximal to the one of the multiple first magnetic layers 21a.

Each of the multiple second magnetic layers 22a has a magnetization 22M. One of the multiple second magnetic layers 22a and one other of the multiple second magnetic layers 22a most proximal to the one of the multiple second magnetic layers 22a are focused upon. The orientation of the magnetization 22M of the one of the multiple second magnetic layers 22a has a component having the opposite orientation of the orientation of the magnetization 22M of the one other of the multiple second magnetic layers 22a most proximal to the one of the multiple second magnetic layers 22a.

In the embodiment, a thickness t1a of one of the multiple first magnetic layers 21a is, for example, 50 nm or less. A thickness t2a of one of the multiple second magnetic layers 22a is, for example, 50 nm or less. Because these thicknesses are 50 nm or less, the formation in the magnetic layers of excessively large magnetic domains can be suppressed. The thickness t1a is, for example, 20 nm or more. The thickness t2a is, for example, 20 nm or more. If the thicknesses are thinner than 20 nm, for example, the magnetization does not move easily; and the effective permeability decreases. Therefore, the shield characteristics degrade. By setting the thickness to be 20 nm or more, appropriate shield characteristics are obtained.

The number of the multiple first magnetic layers 21a is three or more. The number of the multiple second magnetic layers 22a is three or more. For example, the number of the multiple first nonmagnetic layers 21b is two or more. The number of the multiple second nonmagnetic layers 22b is two or more. Thereby, a stable magnetization can be formed in the side shields. The appropriate shield performance is obtained.

It is favorable for the number of the multiple first magnetic layers 21a to be not less than four and not more than eight. It is favorable for the number of the multiple second magnetic layers 22a to be not less than four and not more than eight. For example, it is favorable for the number of the multiple first nonmagnetic layers 21b to be not less than three and not more than seven. It is favorable for the number of the multiple second nonmagnetic layers 22b to be not less than three and not more than seven.

It is favorable for the length in the first stacking direction Ds1 of the stacked structure body provided in the first shield 21 (the region including the multiple first magnetic layers 21a and the multiple first nonmagnetic layers 21b) to be longer than 200 nm. It is favorable for the length along the second stacking direction Ds2 of the stacked structure body provided in the second shield 22 (the region including the multiple second magnetic layers 22a and the multiple second nonmagnetic layers 22b) to be longer than 200 nm. By setting the lengths (the thicknesses) of these regions to be longer than 200 nm, for example, the effects on the magnetic pole-generated magnetic field of the large magnetic domains generated outside the stacked areas can be low.

As shown in FIG. 1, the first shield 21 includes a first outer region 21o. The multiple first magnetic layers 21a and the multiple first nonmagnetic layers 21b are positioned between the magnetic pole 10 and the first outer region 21o. In the example, the first shield 21 further includes a nonmagnetic region 21c. The nonmagnetic region 21c is positioned between the first outer region 21o and the region including the multiple first magnetic layers 21a and the multiple first nonmagnetic layers 21b. The nonmagnetic region 21c may have a configuration similar to that of one of the multiple first nonmagnetic layers 21b.

The second shield 22 includes a second outer region 22o. The multiple second magnetic layers 22a and the multiple second nonmagnetic layers 22b are positioned between the magnetic pole 10 and the second outer region 22o. In the example, the second shield 22 further includes a nonmagnetic region 22c. The nonmagnetic region 22c is positioned between the second outer region 22o and the region including the multiple second magnetic layers 22a and the multiple second nonmagnetic layers 22b. The nonmagnetic region 22c may have a configuration similar to that of one of the multiple second nonmagnetic layers 22b.

Figure 4:
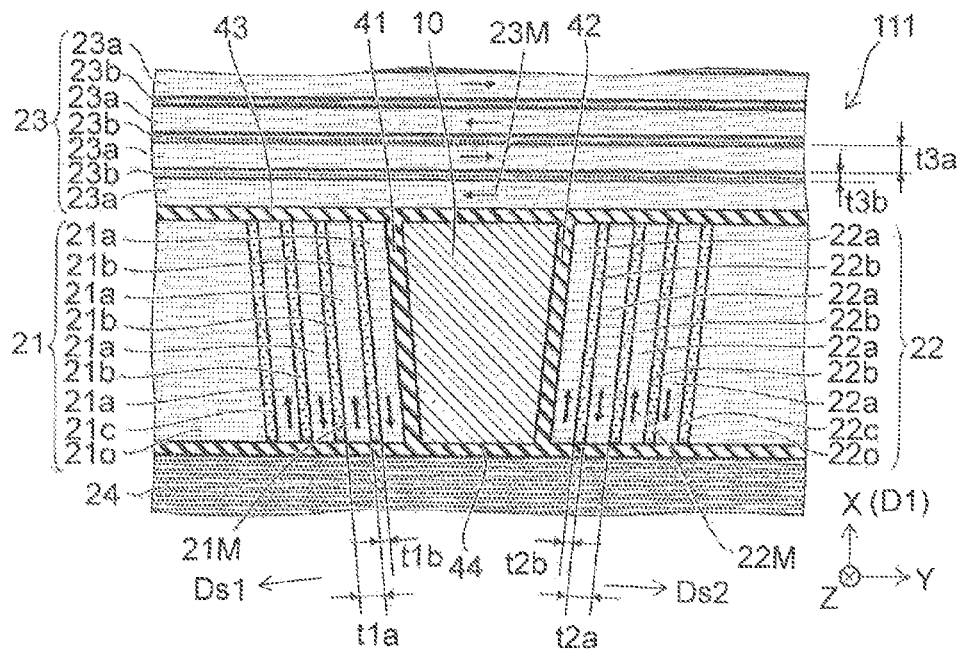
FIG. 4 is a schematic plan view illustrating another magnetic head according to the first embodiment.

FIG. 4 is a schematic plan view illustrating another magnetic head according to the first embodiment.

FIG. 4 is a plan view of the magnetic head 111 when viewed from one direction. This direction is the medium-opposing surface of the magnetic head 111.

As shown in FIG. 4, the other magnetic head 111 according to the embodiment also includes the first shield 21, the second shield, the trailing shield 23, and the magnetic pole 10. In the magnetic head 111, a stacked structure is provided in the trailing shield 23. Otherwise, the magnetic head 111 is similar to the magnetic head 110; and a description is therefore omitted.

In the magnetic head 111, the trailing shield 23 includes multiple third magnetic layers 23a and multiple third nonmagnetic layers 23b. The multiple third magnetic layers 23a and the multiple third nonmagnetic layers 23b are arranged alternately along the first direction D1. The multiple third nonmagnetic layers 23b include at least one selected from the group consisting of Ru, Cu, and Cr. A thickness t3b of each of the multiple third nonmagnetic layers 23b is not less than 0.3 nm and not more than 2.2 nm. In the case where the multiple third nonmagnetic layers 23b include Ru, the thickness t3b is, for example, not less than 0.6 nm and not more than 1.0 nm (e.g., about 0.8 nm). In the case where the multiple third nonmagnetic layers 23b include Cu, the thickness t3b is, for example, not less than 1.3 nm and not more than 1.7 nm (e.g., about 1.5 nm). In the case where the multiple third nonmagnetic layers 23b include Cr, the thickness t3b is, for example, not less than 1.8 nm and not more than 2.2 nm (e.g., about 2.0 nm).

In the magnetic head 111, the relaxation times of the side shields can be short; and the relaxation time of the trailing shield 23 also can be short. A magnetic head and a magnetic recording and reproducing device can be provided in which the response speed can be increased.

For example, the multiple third magnetic layers 23a are antiferromagnetically coupled to each other.

Each of the multiple third magnetic layers 23a has a magnetization 23M. One of the multiple third magnetic layers 23a and one other of the multiple third magnetic layers 23a most proximal to the one of the multiple third magnetic layers 23a are focused upon. The magnetization 23M of the one of the multiple third magnetic layers 23a has a component having the opposite orientation of the orientation of the magnetization 23M of the one other of the multiple third magnetic layers 23a most proximal to the one of the multiple third magnetic layers 23a.

A thickness t3a of one of the multiple third magnetic layers 23a is 50 nm or less. Because the thickness t3a is 50 nm or less, the formation in the magnetic layers of excessively large magnetic domains can be suppressed. The thickness t3a is, for example, 20 nm or more. If the thickness is thinner than 20 nm, for example, the magnetization does not move easily; and the effective permeability decreases. Therefore, the shield characteristics degrade. By setting the thickness to be 20 nm or more, the appropriate shield characteristics are obtained.

The number of the multiple third magnetic layers 23a is three or more. For example, the number of the multiple third nonmagnetic layers 23b is two or more. Thereby, a stable magnetization can be formed in the trailing shield 23. The appropriate shield performance is obtained.

The length in the first direction D1 of the stacked structure body provided in the trailing shield 23 (the region including the multiple third magnetic layers 23a and the multiple third nonmagnetic layers 23b) is, for example, longer than 200 nm. By setting the length (the thickness) of this region to be longer than 200 nm, for example, the effects on the magnetic pole-generated magnetic field of the large magnetic domains generated outside the stacked areas can be low.

Figure 5:
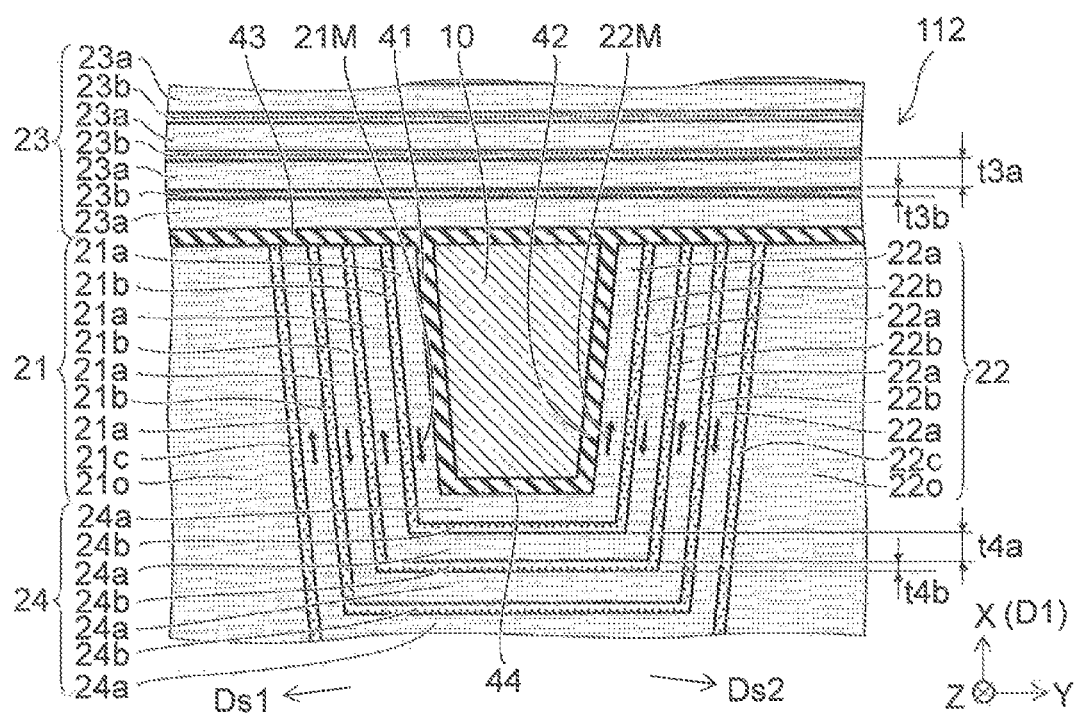
FIG. 5 is a schematic plan view illustrating another magnetic head according to the first embodiment.

FIG. 5 is a schematic plan view illustrating another magnetic head according to the first embodiment.

FIG. 5 is a plan view of the magnetic head 112 when viewed from one direction. This direction is the medium-opposing surface of the magnetic head 112.

As shown in FIG. 5, the other magnetic head 112 according to the embodiment also includes the first shield 21, the second shield, the trailing shield 23, the leading shield 24, and the magnetic pole 10. In the magnetic head 112, a stacked structure is provided in the leading shield 24. Otherwise, the magnetic head 112 is similar to the magnetic head 111; and a description is therefore omitted.

In the magnetic head 112, the leading shield 24 includes multiple fourth magnetic layers 24a and multiple fourth nonmagnetic layers 24b. The multiple fourth magnetic layers 24a and the multiple fourth nonmagnetic layers 24b are arranged alternately along the first direction D1. For example, the multiple fourth nonmagnetic layers 24b include at least one selected from the group consisting of Ru, Cu, and Cr. A thickness t4b of each of the multiple fourth nonmagnetic layers 24b is not less than 0.3 nm and not more than 2.2 nm. In the case where the multiple fourth nonmagnetic layers 24b include Ru, the thickness t4b is, for example, not less than 0.6 nm and not more than 1.0 nm (e.g., about 0.8 nm). In the case where the multiple fourth nonmagnetic layers 24b include Cu, the thickness t4b is, for example, not less than 1.3 nm and not more than 1.7 nm (e.g., about 1.5 nm). In the case where the multiple fourth nonmagnetic layers 24b include Cr, the thickness t2b is, for example, not less than 1.8 nm and not more than 2.2 nm (e.g., about 2.0 nm).

A thickness t4a of one of the multiple fourth magnetic layers 24a is 50 nm or less. The number of the multiple fourth magnetic layers 24a is three or more. For example, the number of the multiple fourth nonmagnetic layers 24b is two or more. For example, the number of the multiple fourth magnetic layers 24a may be the same as the number of the multiple first magnetic layers 21a. For example, the number of the multiple fourth nonmagnetic layers 24b may be the same as the number of the multiple first nonmagnetic layers 21b.

For example, one of the multiple fourth magnetic layers 24a may be continuous with one of the multiple first magnetic layers 21a. For example, one of the multiple fourth nonmagnetic layers 24b may be continuous with one of the multiple first nonmagnetic layers 21b.

In the magnetic head 112 as well, the response speed can be increased.

An example of a method for manufacturing the magnetic head according to the embodiment will now be described. The description recited below corresponds to the method for manufacturing the magnetic head 112.

FIG. 6A to FIG. 6D are schematic cross-sectional views in order of the processes, illustrating the method for manufacturing the magnetic head according to the first embodiment.

Figure 6A:
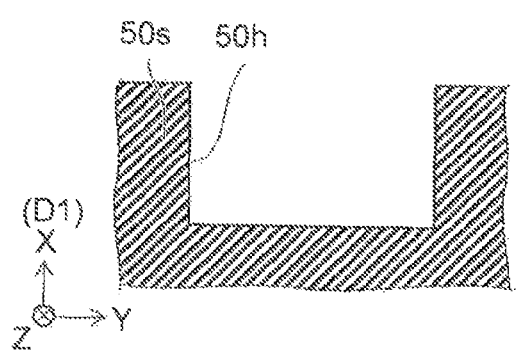
FIG. 6A to FIG. 6D are schematic cross-sectional views in order of the processes, illustrating a method for manufacturing the magnetic head according to the first embodiment.

As shown in FIG. 6A, a recess 50h is formed in the front surface of a base body 50s. The base body 50s includes, for example, a magnetic material (e.g., CoFe, etc.).

Figure 6B:
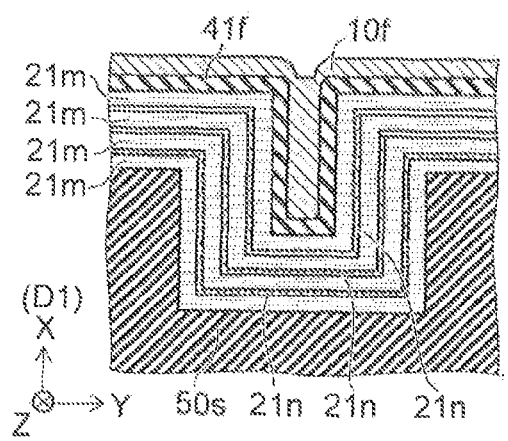

As shown in FIG. 6B, a magnetic film 21m and a nonmagnetic film 21n are multiply formed alternately on the base body 50s. Further, an insulating film 41f and a magnetic pole film 10f are formed. The magnetic film 21m includes, for example, at least one selected from the group consisting of Fe, Co, and Ni. The nonmagnetic film 21n includes at least one selected from the group consisting of Ru, Cu, and Cr. The insulating film 41f includes, for example, silicon oxide. The magnetic pole film 10f Includes, for example, at least one selected from the group consisting of Fe, Co, and Ni. These films are formed also inside the recess 50h. The Insulating film 41f includes, for example, silicon oxide.

Figure 6C:
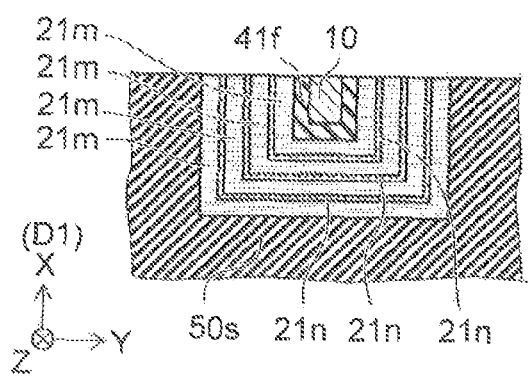

The upper surface is polished as shown in FIG. 6C. Thereby, the magnetic pole film 10f is exposed. The magnetic pole film 10f becomes the magnetic pole 10. The magnetic films 21m become the first magnetic layers 21a, the second magnetic layers 22a, and the fourth magnetic layers 24a. The nonmagnetic films 21n become the first nonmagnetic layers 21b, the second nonmagnetic layers 22b, and the fourth nonmagnetic layers 24b. The insulating film 41f becomes the first insulating portion 41, the second insulating portion 42, and the fourth insulating portion 44.

Figure 6D:
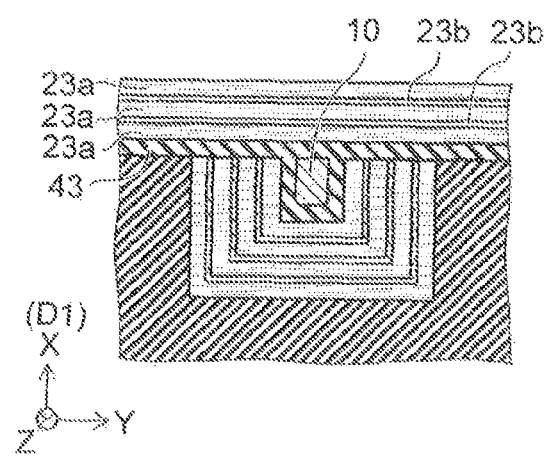

The third insulating portion 43 is formed as shown in FIG. 6D. The third magnetic layer 23a and the third nonmagnetic layer 23b are multiply formed alternately on the third insulating portion 43. Thereby, the magnetic head 112 is made.

Figure 7:
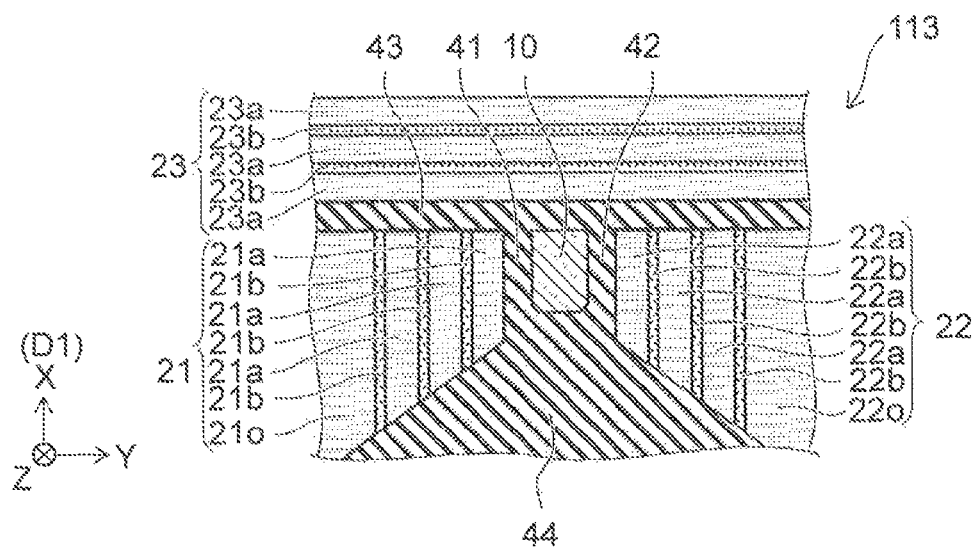
FIG. 7 is a schematic plan view illustrating another magnetic head according to the first embodiment.

FIG. 7 is a schematic plan view illustrating another magnetic head according to the first embodiment.

FIG. 7 is a plan view of the magnetic head 113 when viewed from one direction. This direction is the medium-opposing surface of the magnetic head 113.

As shown in FIG. 7, the other magnetic head 113 according to the embodiment also includes the first shield 21, the second shield 22, the trailing shield 23, and the magnetic pole 10. In the magnetic head 113, the leading shield is omitted. Otherwise, for example, the magnetic head 113 is similar to the magnetic head 111. In the magnetic head 113 as well, the response speed can be increased.

Second Embodiment

A second embodiment relates to a magnetic memory device. The magnetic memory device according to the embodiment includes a magnetic head and a magnetic recording medium (e.g., a recording medium disk 180 described below). Information is recorded by the magnetic pole 10 in the magnetic recording medium. The magnetic head is any magnetic head according to the first embodiment or a magnetic head of a modification of the first embodiment. The case where the magnetic head 110 is used will now be described.

Figure 8:
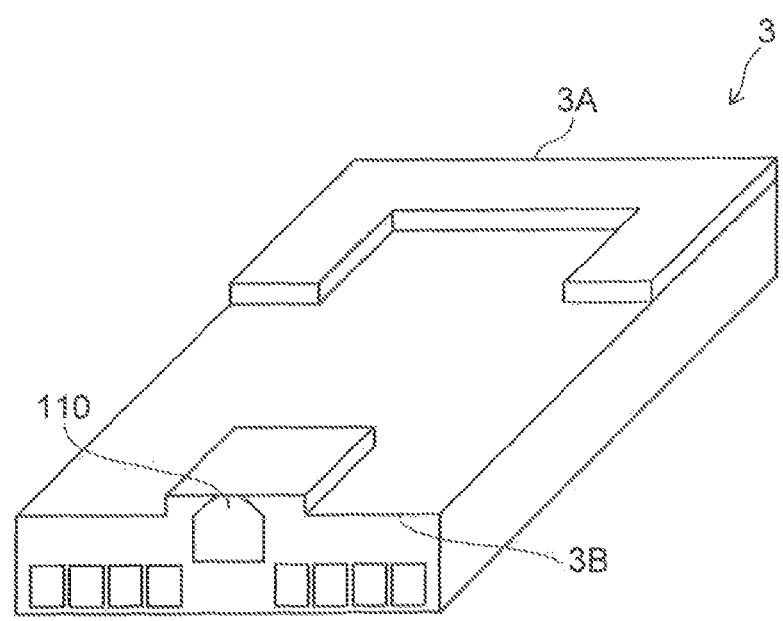
FIG. 8 is a schematic perspective view illustrating a portion of a magnetic recording and reproducing device according to a second embodiment.

FIG. 8 is a schematic perspective view illustrating a portion of a magnetic recording and reproducing device according to the second embodiment.

FIG. 8 illustrates a head slider.

The magnetic head 110 is provided in the head slider 3. The head slider 3 includes, for example, $Al_2O_3$/TiC, etc. The head slider 3 moves relative to the magnetic recording medium while flying over or contacting the magnetic recording medium.

The head slider 3 has, for example, an air inflow side 3A and an air outflow side 3B. The magnetic head 110 is disposed at the side surface of the air outflow side 3B of the head slider 3 or the like. Thereby, the magnetic head 110 moves relative to the magnetic recording medium while flying over or contacting the magnetic recording medium.

Figure 9:
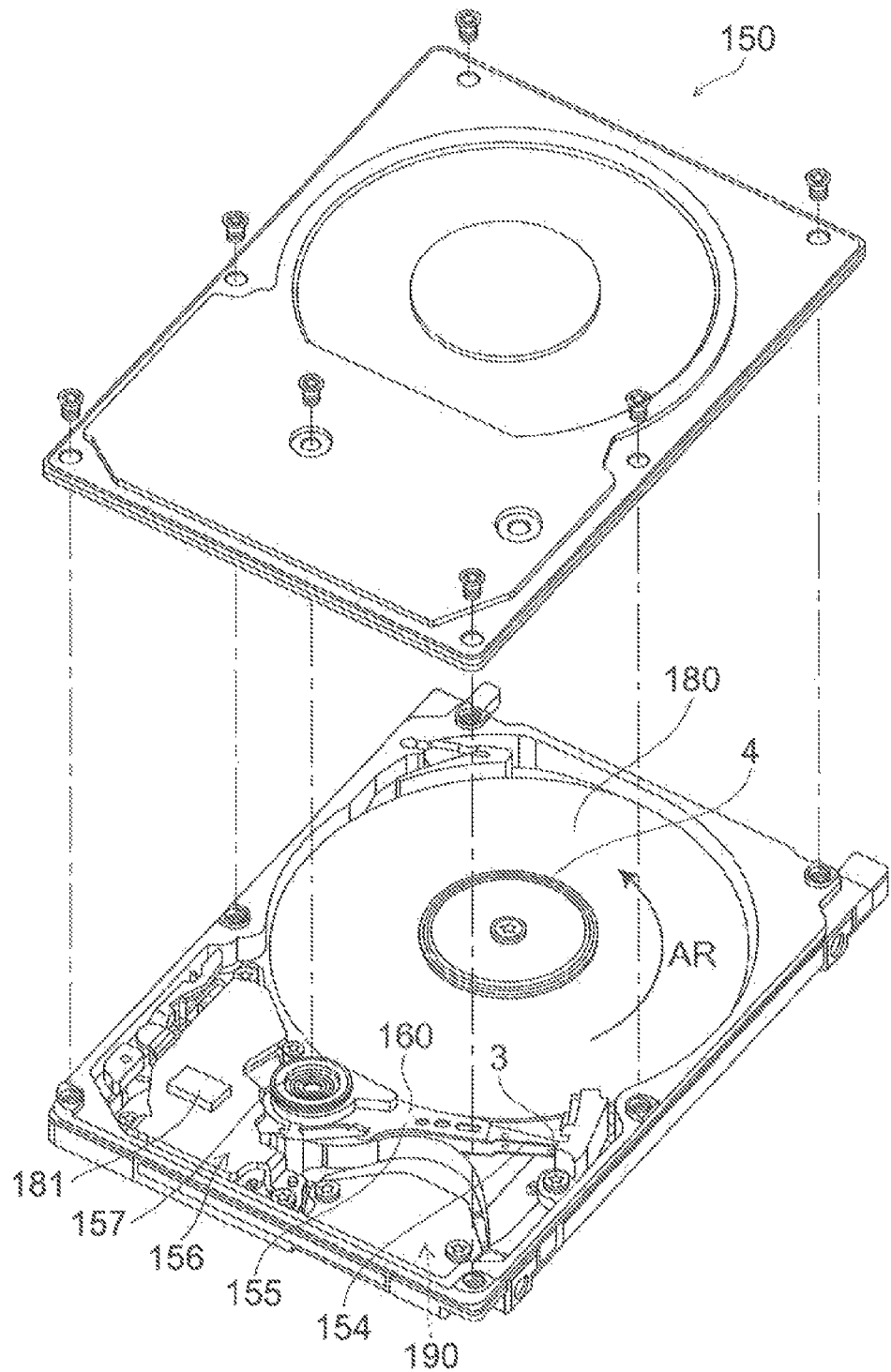
FIG. 9 is a schematic perspective view illustrating the magnetic recording and reproducing device according to the second embodiment.

FIG. 9 is a schematic perspective view illustrating the magnetic recording and reproducing device according to the second embodiment.

Figure 10A:
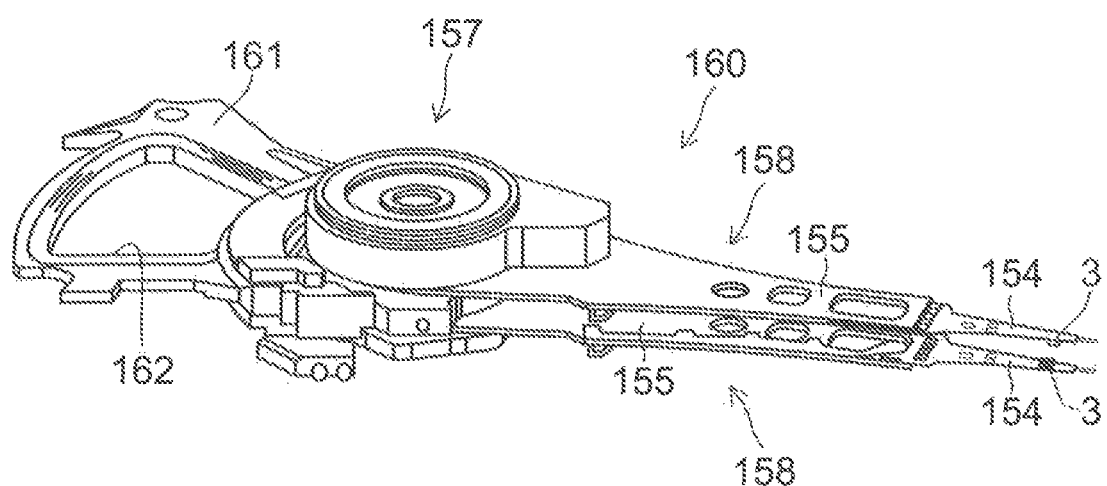
FIG. 10A and FIG. 10B are schematic perspective views illustrating portions of the magnetic recording and reproducing device according to the second embodiment.
Figure 10B:
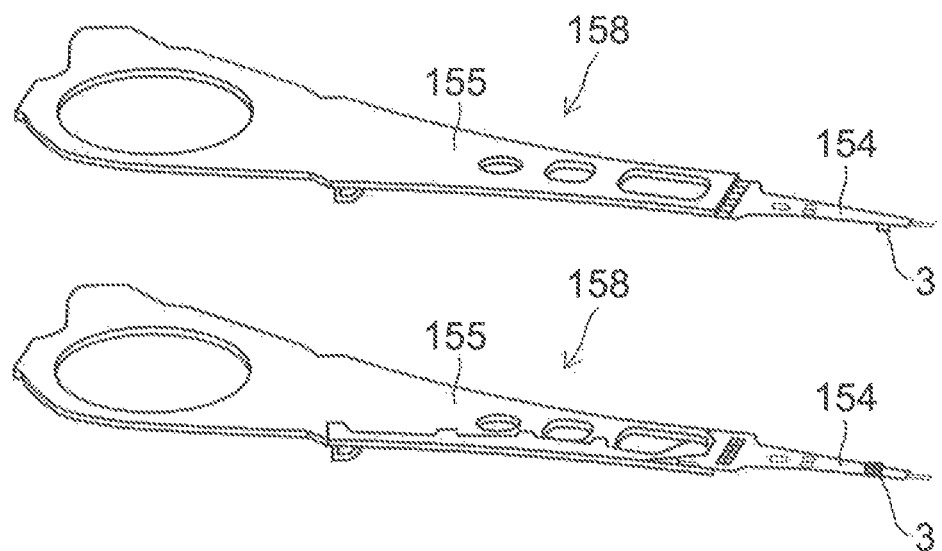

FIG. 10A and FIG. 10B are schematic perspective views illustrating portions of the magnetic recording and reproducing device according to the second embodiment.

As shown in FIG. 9, a rotary actuator is used in the magnetic recording and reproducing device 150 according to the embodiment. The recording medium disk 180 is mounted to a spindle motor 4. The recording medium disk 180 is rotated in the direction of arrow AR by a motor. The motor responds to a control signal from a drive device controller. The magnetic recording and reproducing device 150 according to the embodiment may include multiple recording medium disks 180. The magnetic recording and reproducing device 150 may include a recording medium 181. The recording medium 181 is, for example, a SSD (Solid State Drive). The recording medium 181 includes nonvolatile memory such as flash memory, etc. For example, the magnetic recording and reproducing device 150 may be a hybrid HDD (Hard Disk Drive).

The head slider 3 performs the recording and reproducing of the information recorded in the recording medium disk 180. The head slider 3 is provided at the tip of a suspension 154 having a thin-film configuration. Any of the magnetic heads according to the embodiments is provided at the tip vicinity of the head slider 3.

When the recording medium disk 180 rotates, the downward pressure due to the suspension 154 and the pressure generated at the medium-opposing surface (the ABS) of the head slider 3 are balanced. The distance between the medium-opposing surface of the head slider 3 and the front surface of the recording medium disk 180 is a prescribed fly height. In the embodiment, the head slider 3 may contact the recording medium disk 180. For example, a contact-sliding-type is applicable.

The suspension 154 is connected to one end of an arm 155 (e.g., an actuator arm). The arm 155 includes, for example, a bobbin unit, etc. The bobbin unit holds a drive coil. A voice coil motor 156 is provided at one other end of the arm 155. The voice coil motor 156 is one type of linear motor. The voice coil motor 156 includes, for example, a drive coil and a magnetic circuit. The drive coil is wound onto the bobbin unit of the arm 155. The magnetic circuit includes a permanent magnet and an opposing yoke. The drive coil is provided between the permanent magnet and the opposing yoke. The suspension 154 has one end and one other end. The magnetic head is provided at the one end of the suspension 154. The arm 155 is connected to the one other end of the suspension 154.

The arm 155 is held by ball bearings. The ball bearings are provided at two locations on and under a bearing unit 157. The arm 155 can be caused to rotate and slide by the voice coil motor 156. The magnetic head is movable to any position of the recording medium disk 180.

FIG. 10A illustrates the configuration of a portion of the magnetic recording and reproducing device and is an enlarged perspective view of a head stack assembly 160.

FIG. 10B is a perspective view illustrating a magnetic head assembly (a head gimbal assembly (HGA)) 158 which is a portion of the head stack assembly 160.

As shown in FIG. 10A, the head stack assembly 160 includes the bearing unit 157, the head gimbal assembly 158, and a support frame 161. The head gimbal assembly 158 extends from the bearing unit 157. The support frame 161 extends from the bearing unit 157. The direction in which the support frame 161 extends is the reverse of the direction in which the head gimbal assembly 158 extends. The support frame 161 supports a coil 162 of the voice coil motor.

As shown in FIG. 10B, the head gimbal assembly 158 includes the arm 155 that extends from the bearing unit 157, and the suspension 154 that extends from the arm 155.

The head slider 3 is provided at the tip of the suspension 154. Any of the magnetic heads according to the embodiments is provided in the head slider 3.

The magnetic head assembly (the head gimbal assembly) 158 according to the embodiment includes the magnetic head according to the embodiment, the head slider 3 in which the magnetic head is provided, the suspension 154, and the arm 155. The head slider 3 is provided at the one end of the suspension 154. The arm 155 is connected to the one other end of the suspension 154.

The suspension 154 includes, for example, lead wires (not Illustrated) for recording and reproducing signals. The suspension 154 may include, for example, lead wires (not illustrated) for a heater for fly height adjustment. The suspension 154 may include, for example, lead wires (not illustrated) for a spin torque oscillator, etc. These lead wires are electrically connected to multiple electrodes provided in the magnetic head.

A signal processor 190 is provided in the magnetic recording and reproducing device 150. The signal processor 190 performs recording and reproducing of the signals to and from the magnetic recording medium by using the magnetic head. The signal processor 190 is electrically connected to the magnetic head by the input/output lines of the signal processor 190 being connected to, for example, electrode pads of the head gimbal assembly 158.

The magnetic recording and reproducing device 150 according to the embodiment includes a magnetic recording medium, the magnetic head according to the embodiment, a movable unit, a position controller, and a signal processor. The movable unit is relatively movable in a state in which the magnetic recording medium and the magnetic head are separated from each other or in contact with each other. The position controller aligns the magnetic head at a prescribed recording position of the magnetic recording medium. The signal processor performs recording and reproducing of the signals to and from the magnetic recording medium by using the magnetic head.

For example, the recording medium disk 180 is used as the magnetic recording medium recited above. The movable unit recited above includes, for example, the head slider 3. The position controller recited above includes, for example, the head gimbal assembly 158.

The magnetic recording and reproducing device 150 according to the embodiment includes the magnetic recording medium, the magnetic head assembly according to the embodiment, and the signal processor that performs recording and reproducing of the signals to and from the magnetic recording medium by using the magnetic head provided in the magnetic head assembly.

The embodiments may include the following configurations.

(Configuration 1)

A magnetic head, comprising:

a first shield;

a second shield;

a magnetic pole provided between the first shield and the second shield; and a trailing shield separated from the magnetic pole in a first direction crossing a direction from the first shield toward the second shield, the first shield including a plurality of first magnetic layers and a plurality of first nonmagnetic layers arranged alternately along a first stacking direction crossing the first direction, the plurality of first nonmagnetic layers including at least one selected from the group consisting of Ru, Cu, and Cr, thicknesses of the plurality of first nonmagnetic layers each being not less than 0.3 nanometers and not more than 2.2 nanometers, the second shield including a plurality of second magnetic layers and a plurality of second nonmagnetic layers arranged alternately along a second stacking direction crossing the first direction, the plurality of second nonmagnetic layers including at least one selected from the group consisting of Ru, Cu, and Cr, thicknesses of the plurality of second nonmagnetic layers each being not less than 0.3 nanometers and not more than 2.2 nanometers.

(Configuration 2)

The magnetic head according to configuration 1, wherein a magnetization of one of the plurality of first magnetic layers has a component having the opposite orientation of an orientation of a magnetization of one other of the plurality of first magnetic layers most proximal to the one of the plurality of first magnetic layers, and an orientation of a magnetization of one of the plurality of second magnetic layers has a component having the opposite orientation of an orientation of a magnetization of one other of the plurality of second magnetic layers most proximal to the one of the plurality of second magnetic layers.

(Configuration 3)

The magnetic head according to configuration 1, wherein
the plurality of first magnetic layers are antiferromagnetically coupled to each other, and
the plurality of second magnetic layers are antiferromagnetically coupled to each other.

(Configuration 4)

The head according to one of configurations 1 to 3, wherein
a thickness of one of the plurality of first magnetic layers is 50 nanometers or less, and
a thickness of one of the plurality of second magnetic layers is 50 nanometers or less.

(Configuration 5)

The magnetic head according to one of configurations 1 to 4, wherein
number of the plurality of first magnetic layers is three or more, and
number of the plurality of second magnetic layers is three or more.

(Configuration 6)

The magnetic head according to one of configurations 1 to 5, wherein
number of the plurality of first nonmagnetic layers is two or more, and
number of the plurality of second nonmagnetic layers is two or more.

(Configuration 7)

The magnetic head according to one of configurations 1 to 6, wherein
a length in the first stacking direction of a region including the plurality of first magnetic layers and the plurality of first nonmagnetic layers is longer than 200 nanometers, and
a length in the second stacking direction of a region including the plurality of second magnetic layers and the plurality of second nonmagnetic layers is longer than 200 nanometers.

(Configuration 8)

The magnetic head according to one of configurations 1 to 7, wherein the trailing shield includes a plurality of third magnetic layers and a plurality of third nonmagnetic layers arranged alternately along the first direction, the plurality of third nonmagnetic layers including at least one selected from the group consisting of Ru, Cu, and Cr, thicknesses of the plurality of third nonmagnetic layers each being not less than 0.3 nanometers and not more than 2.2 nanometers.

(Configuration 9)

The magnetic head according to configuration 8, wherein a magnetization of one of the plurality of third magnetic layers has a component having the opposite orientation of an orientation of a magnetization of one other of the plurality of third magnetic layers most proximal to the one of the plurality of third magnetic layers.

(Configuration 10)

The magnetic head according to configuration 8, wherein the plurality of third magnetic layers are antiferromagnetically coupled to each other.

(Configuration 11)

The magnetic head according to one of configurations 8 to 10, wherein a thickness of one of the plurality of third magnetic layers is 50 nanometers or less.

(Configuration 12)

The magnetic head according to one of configurations 8 to 11, wherein number of the plurality of third magnetic layers is three or more.

(Configuration 13)

The magnetic head according to one of configurations 8 to 12, wherein number of the plurality of third nonmagnetic layers is two or more.

(Configuration 14)

The magnetic head according to one of configurations 8 to 13, wherein a length in the first direction of a region including the plurality of third magnetic layers and the plurality of third nonmagnetic layers is longer than 200 nanometers.

(Configuration 15)

The magnetic head according to one of configurations 1 to 14, wherein
the first shield includes a first outer region, the plurality of first magnetic layers and the plurality of first nonmagnetic layers are positioned between the magnetic pole and the first outer region, and
the second shield includes a second outer region, the plurality of second magnetic layers and the plurality of second nonmagnetic layers are positioned between the magnetic pole and the second outer region.

(Configuration 16)

The magnetic head according to one of configurations 1 to 15, further comprising a leading shield,
the magnetic pole being provided between the trailing shield and the leading shield.

(Configuration 17)

A magnetic recording and reproducing device, comprising:
the magnetic head according to one of configurations 1 to 16; and
a magnetic recording medium, information being recorded in the magnetic recording medium by the magnetic pole.

According to the embodiment, a magnetic head and a magnetic recording and reproducing device can be provided in which the response speed can be increased.

In the specification of the application, "perpendicular" and "parallel" refer to not only strictly perpendicular and strictly parallel but also include, for example, the fluctuation due to manufacturing processes, etc. It is sufficient to be substantially perpendicular and substantially parallel.

Hereinabove, exemplary embodiments of the invention are described with reference to specific examples. However, the embodiments of the invention are not limited to these specific examples. For example, one skilled in the art may similarly practice the invention by appropriately selecting specific configurations of components included in magnetic heads such as magnetic poles, first shields, second shields, trailing shields, leading shields, etc., from known art. Such practice is included in the scope of the invention to the extent that similar effects thereto are obtained.

Further, any two or more components of the specific examples may be combined within the extent of technical feasibility and are included in the scope of the invention to the extent that the purport of the invention is included.

Moreover, all magnetic heads and magnetic recording and reproducing devices practicable by an appropriate design modification by one skilled in the art based on the magnetic heads and magnetic recording and reproducing devices described above as embodiments of the invention also are within the scope of the invention to the extent that the spirit of the invention is included.

Various other variations and modifications can be conceived by those skilled in the art within the spirit of the invention, and it is understood that such variations and modifications are also encompassed within the scope of the invention.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. A magnetic head, comprising:
a first shield;
a second shield;
a magnetic pole provided between the first shield and the second shield; and
a trailing shield separated from the magnetic pole in a first direction crossing a direction from the first shield toward the second shield,
the first shield including a plurality of first magnetic layers and a plurality of first nonmagnetic layers arranged alternately along a first stacking direction crossing the first direction, the first nonmagnetic layers including at least one selected from the group consisting of Ru, Cu, and Cr, thicknesses of the first nonmagnetic layers each being not less than 0.3 nanometers and not more than 2.2 nanometers,
the second shield including a plurality of second magnetic layers and a plurality of second nonmagnetic layers arranged alternately along a second stacking direction crossing the first direction, the second nonmagnetic layers including at least one selected from the group consisting of Ru, Cu, and Cr, thicknesses of the second nonmagnetic layers each being not less than 0.3 nanometers and not more than 2.2 nanometers.

2. The head according to claim 1, wherein
a magnetization of one of the first magnetic layers has a component having the opposite orientation of an orientation of a magnetization of one other of the first magnetic layers most proximal to the one of the first magnetic layers, and
an orientation of a magnetization of one of the second magnetic layers has a component having the opposite orientation of an orientation of a magnetization of one other of the second magnetic layers most proximal to the one of the second magnetic layers.

3. The head according to claim 1, wherein
the first magnetic layers are antiferromagnetically coupled to each other, and
the second magnetic layers are antiferromagnetically coupled to each other.

4. The head according to claim 1, wherein
a thickness of one of the first magnetic layers is 50 nanometers or less, and
a thickness of one of the second magnetic layers is 50 nanometers or less.

5. The head according to claim 1, wherein
number of the first magnetic layers is three or more, and
number of the second magnetic layers is three or more.

6. The head according to claim 1, wherein
a number of the first nonmagnetic layers is two or more, and
a number of the second nonmagnetic layers is two or more.

7. The head according to claim 1, wherein
a length in the first stacking direction of a region including the first magnetic layers and the first nonmagnetic layers is longer than 200 nanometers, and
a length in the second stacking direction of a region including the second magnetic layers and the second nonmagnetic layers is longer than 200 nanometers.

8. The head according to claim 1, wherein the trailing shield includes a plurality of third magnetic layers and a plurality of third nonmagnetic layers arranged alternately along the first direction, the third nonmagnetic layers including at least one selected from the group consisting of Ru, Cu, and Cr, thicknesses of the third nonmagnetic layers each being not less than 0.3 nanometers and not more than 2.2 nanometers.

9. The head according to claim 8, wherein a magnetization of one of the third magnetic layers has a component having the opposite orientation of an orientation of a magnetization of one other of the third magnetic layers most proximal to the one of the third magnetic layers.

10. The head according to claim 8, wherein the third magnetic layers are antiferromagnetically coupled to each other.

11. The head according to claim 8, wherein a thickness of one of the third magnetic layers is 50 nanometers or less.

12. The head according to claim 8, wherein number of the third magnetic layers is three or more.

13. The head according to claim 8, wherein a number of the third nonmagnetic layers is two or more.

14. The head according to claim 8, wherein a length in the first direction of a region including the third magnetic layers and the third nonmagnetic layers is longer than 200 nanometers.

15. The head according to claim 1, wherein
the first shield includes a first outer region, the first magnetic layers and the first nonmagnetic layers are positioned between the magnetic pole and the first outer region, and
the second shield includes a second outer region, the second magnetic layers and the second nonmagnetic layers are positioned between the magnetic pole and the second outer region.

16. The head according to claim 1, further comprising a leading shield,
the magnetic pole being provided between the trailing shield and the leading shield.

17. A magnetic recording and reproducing device, comprising:
the magnetic head according to claim 1; and
a magnetic recording medium, information being recorded in the magnetic recording medium by the magnetic pole.

* * * * *